United States Patent
Prasad

(10) Patent No.: US 6,707,263 B1
(45) Date of Patent: Mar. 16, 2004

(54) HIGH-INTENSITY DISCHARGE LAMP BALLAST WITH LIVE RELAMPING FEATURE

(75) Inventor: Himamshu V. Prasad, Rolling Meadows, IL (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/261,030

(22) Filed: Sep. 30, 2002

(51) Int. Cl.[7] ............................................. H05B 37/02
(52) U.S. Cl. .................. 315/291; 315/DIG. 4; 315/224
(58) Field of Search ............................... 315/224, 225, 315/219, 291, 307, 308, 209 R, DIG. 4, DIG. 5

(56) References Cited

U.S. PATENT DOCUMENTS 6,040,661 A * 3/2000 Bogdan ...................... 315/224
6,051,940 A * 4/2000 Arun .......................... 315/307
6,259,215 B1 * 7/2001 Roman ........................ 315/307
6,498,436 B2 * 12/2002 Hartge et al. .................. 315/86

* cited by examiner

*Primary Examiner*—Wilson Lee
(74) *Attorney, Agent, or Firm*—Kenneth D. Labudda

(57) ABSTRACT

A dimming ballast (100) for a high-intensity discharge lamp (10) includes an ignitor (120), a control circuit (140), and a dimming interface (160) for connection to an external dimming controller (30). Following lamp replacement (10), external dimming controller (30) receives a user relamp command and, in response, sends a special relamp signal to dimming interface (160). In response to the special relamp signal, dimming interface (160) communicates with control circuit (140), which directs ignitor (120) to provide high voltage pulses for igniting the replaced lamp. In an alternative embodiment, an external control device such as a triac dimmer (40) receives a user relamp command following lamp replacement and, in response, sends a special relamp signal to a control circuit (240), which directs ignitor (220) to provide high voltage pulses for igniting the replaced lamp.

9 Claims, 2 Drawing Sheets

HIGH-INTENSITY DISCHARGE LAMP BALLAST WITH LIVE RELAMPING FEATURE

FIELD OF THE INVENTION

The present invention relates to the general subject of circuits for powering discharge lamps. More particularly, the present invention relates to a ballast for high intensity discharge lamps that accommodates lamp replacement and ignition while power is applied to the ballast.

BACKGROUND OF THE INVENTION

Electronic ballasts for powering high-intensity discharge (HID) lamps usually have a timed ignition period of about 20 to 30 minutes, during which time high voltage pulses (e.g., of 3000 volts or more) are provided in order to ignite the lamp. For reasons of safety and reliability, if the lamp does not ignite within the timed ignition period, the ballast stops providing the ignition pulses.

When a HID lamp reaches the end of its useful operating life, the lamp either self-extinguishes or is extinguished by end-of-life protection circuitry in the ballast. If the lamp is replaced, the fact that a new lamp has been installed is not easily sensed because, unlike fluorescent lamps, HID lamps do not have filaments. Thus, in order to restart the timed ignition period and provide high voltage pulses for igniting the lamp, the input power to the ballast needs to be toggled in order to reset the ignition timer circuitry within the ballast. While toggling of the input power will work fine in applications where only one ballast is coupled to an electrical branch circuit, it is not a practical solution in typical installations where multiple ballasts and lamps are powered from the same branch circuit. In the latter case, toggling of the input power will extinguish the other operating lamps, and the hot reignition of the extinguished lamps may take up to 10 minutes or more.

Currently, no manufacturer appears to offer an electronic HID ballast with a live relamping feature. Moreover, although there are a number of possible approaches that may be used to address this problem, each has significant disadvantages.

In one possible approach, the ballast may be designed such that ignition pulses are turned on and off at a predetermined rate. For example, after the lamp has extinguished (due to end-of-life), the ignition pulses could be turned on (e.g., for a few minutes) and turned off (e.g., for a few hours). This will ensure that a replaced lamp will eventually light up when the ignition pulses are turned on. The disadvantages of this approach include safety and reliability concerns due to the periodic (though not continuous) application of ignition pulses, as well as the fact that ignition of the replaced lamp may not occur for as long as several hours following replacement. With regard to the latter disadvantage, it should be appreciated that prompt ignition of a replaced lamp is highly desirable.

Another possible approach involves providing a mechanical switch or reset button on the ballast, wherein the switch or button is momentarily depressed by a user (i.e., the person who changed the lamp) following lamp replacement in order to direct the ballast to provide ignition pulses. An obvious disadvantage of this approach is that the switch or button would have to be made accessible to the user, which is not practical in most installations.

A third approach would be to equip the ballast with a wireless receiver, wherein a user may send a signal to the ballast via a wireless remote control in order to direct the ballast to provide ignition pulses following lamp replacement. Because of the additional circuitry that would be required, this approach is quite complex and expensive.

Thus, a need exists for an electronic HID ballast that accommodates live relamping in an efficient and cost-effective manner, and without negatively affecting other ballasts and lamps that are operating at the same time. Such a ballast would represent a considerable advance over the prior art.

DETAILED DESCRIPTION OF THE PREFERRED EMBODIMENTS

Figure 1:
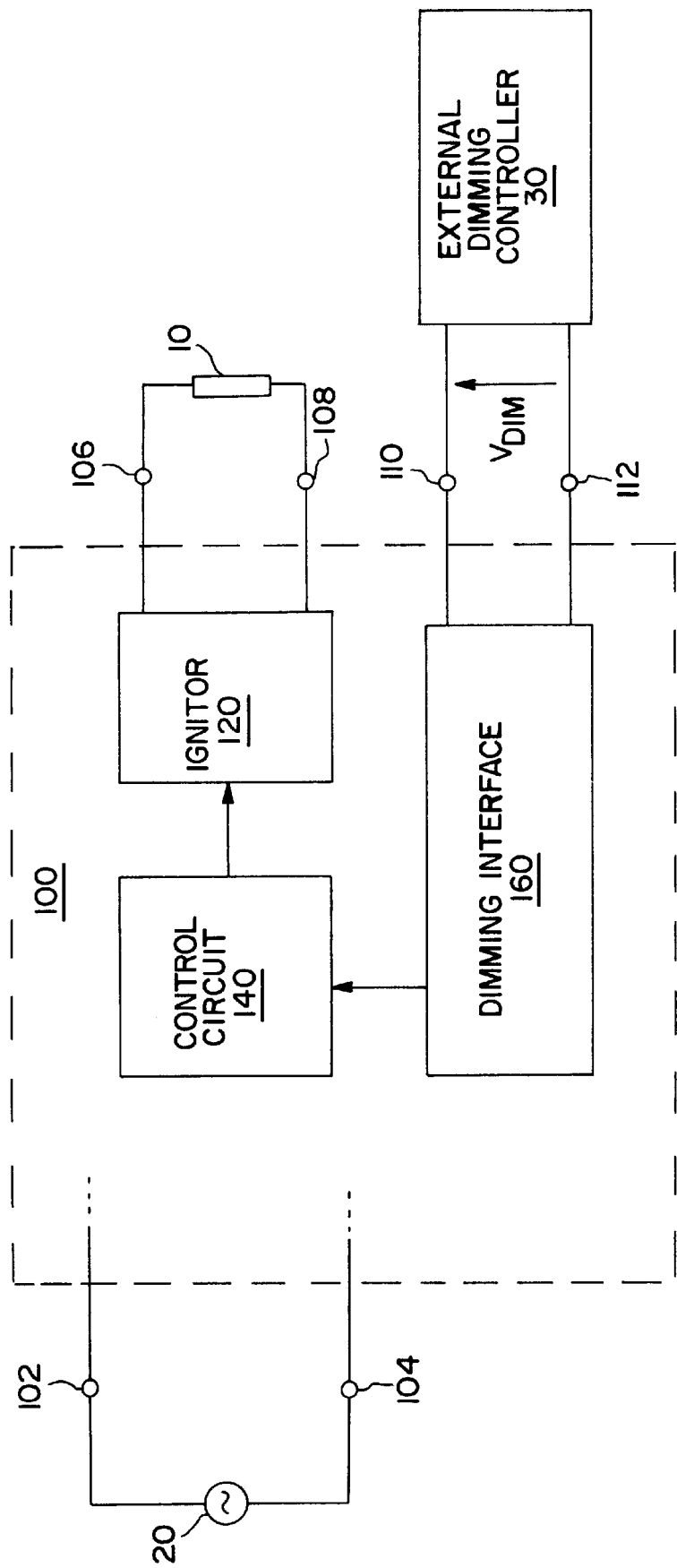
FIG. 1 describes a ballast for high intensity discharge lamps that implements a live relamping feature via an external dimming controller, in accordance with a first preferred embodiment of the present invention.

A first preferred embodiment of the present invention is described with reference to FIG. 1. Ballast 100 includes a pair of input connections 102,104 adapted to receive a source of conventional alternating current (AC) voltage 20, a pair of output connections 106,108 for connection to at least one high-intensity discharge (HID) lamp 10, and a pair of dimming control inputs 110,112 for connection to an external dimming controller (30). Ballast 100 is an electronic HID dimming ballast that includes an ignitor 120, a control circuit 140, and a dimming interface 160. Ignitor 120 is coupled to output connections 106,108. Control circuit 140 is coupled to ignitor 120. Dimming interface 160 is coupled to control circuit 140 and to dimming control inputs 110,112.

It should of course be understood that ballast 100 preferably includes other circuits, such as an inverter for providing steady-state power to lamp 10 and a suitable front-end for providing current-limiting and/or power factor correction, which are not shown or described in detail herein.

During operation, ignitor 120 provides high voltage ignition pulses between output connections 106,108 for igniting lamp 10. Control circuit 140, which is coupled to ignitor 120, controls when and how ignitor 120 provides ignition pulses. Dimming interface 160, which is coupled to dimming control inputs 110,112 as well as control circuit 140, receives a dimming voltage signal ($V_{DIM}$) from external dimming controller 30. In response to $V_{DIM}$, dimming interface 160 directs other circuitry in ballast 100 (e.g., an inverter circuit, not shown) to correspondingly adjust the amount of current supplied to lamp 10.

For the aforementioned normal operating purposes, ignitor 120, control circuit 140, dimming interface 160, and external dimming controller 30 may all be realized by circuits that are well-known to those skilled in the art. For example, dimming interface 160 may realized according to the teachings of U.S. Pat. No. 5,457,360, the pertinent disclosure of which is incorporated herein by reference. Similarly, ignitor 120 and control circuit 140 are realizable by any of a number of suitable circuits known in the art.

In addition to its aforementioned functionality with regard to effecting adjustment of the amount of current provided to lamp 10, dimming interface 160 is configured to receive a special relamping signal from external dimming controller 30. The special relamping signal may consist of any of a large number of possible signals. As but one example, the special relamping signal may consist of a squarewave or trapezoidal signal having a positive transition from about zero volts to about ten volts, followed by a negative transition from about ten volts to about zero volts. Such a signal can be provided by having the user provide a user relamp command by rotating the adjustment knob of external dimming controller 30 fully clockwise (i.e., zero to 10 volts) and then fully counterclockwise (i.e., 10 volts to zero volts). In the case of an external dimming controller that has a slide adjustment rather than a rotatable knob, the same signal can be achieved by moving the slide adjustment to one extreme and then the other. Alternatively, the special relamping signal may be generated via a dedicated "relamp" pushbutton switch on external dimming controller 30 that, when depressed and released by the user, provides the same type of transitions as previously described.

Upon receipt of the special relamping signal, dimming interface 160 communicates with control circuit 140, which directs ignitor 120 to immediately provide high voltage ignition pulses for igniting lamp 10. In this way, ballast 100 uses its preexisting dimming interface 160 to provide for prompt ignition of a replaced lamp without requiring cycling of the AC input power.

The live relamping approach just described with reference to FIG. 1 is well-suited for installations that include dimming ballasts because external dimming controller 30, as well as the low voltage control wiring by which external dimming controller 30 interacts with dimming interface 160, is already present. An alternative preferred approach that is well suited for installations that do not include dimming ballasts is described in FIG. 2.

Figure 2:
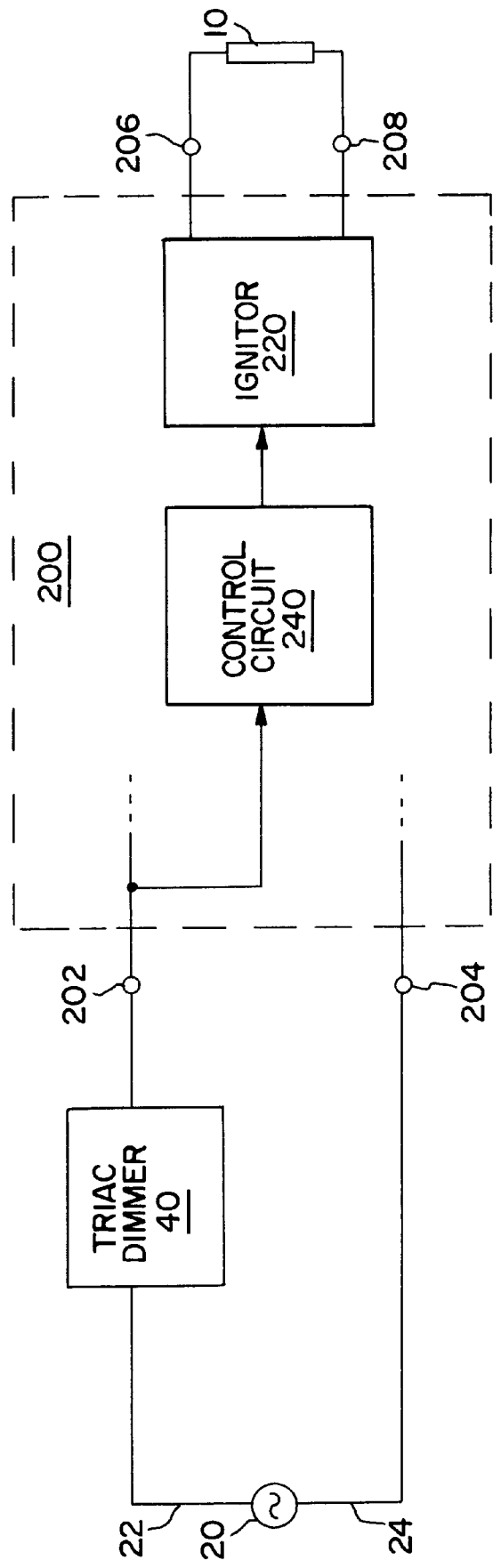
FIG. 2 describes a ballast for high intensity discharge lamps that implements a live relamping feature via a triac dimmer, in accordance with a second preferred embodiment of the present invention.

Referring now to FIG. 2, a ballast 200 for powering at least one HID lamp comprises first and second input connections 202,204, a pair of output connections 206,208, an ignitor 220, and a control circuit 240. Input connections 202,204 are adapted to receive a conventional source of alternating current (AC) voltage 20, such as 120 volts (rms) at 60 hertz. More specifically, first input connection 202 is coupled to a hot lead 22 of AC source 20 via an external control device 40 that can be implemented, for example, by a triac dimmer; second input connection 204 is coupled to a neutral lead 24 of AC source 20. Output connections 206, 208 are adapted for connection to HID lamp 10. Control circuit 240 is coupled between first input connection 202 and ignitor 220. Ignitor 220 is coupled to control circuit 240 and output connections 206,208.

Following a replacement of lamp 10, the user (i.e., the person who just replaced the lamp) provides a user relamp command to triac dimmer 40 to indicate that lamp 10 has been replaced. In response to the user relamp command, triac dimmer generates a special relamp signal. For example, a user can manipulate triac dimmer 40 so that triac dimmer 40 momentarily "chops" (i.e., truncates at least a portion of one half-cycle of) the sinusoidal AC voltage provided to input connections 202,204. Control circuit 240 detects this momentary "chop" in the AC voltage and correspondingly directs ignitor 220 to immediately provide high voltage pulses for igniting lamp 10. In this way, ballast 200 works in conjunction with a triac dimmer (or other suitable control device placed in series with the AC line) to provide for prompt ignition of a replaced lamp without requiring cycling of the AC input power.

Although the present invention has been described with reference to certain preferred embodiments, numerous modifications and variations can be made by those skilled in the art without departing from the novel spirit and scope of this invention.

What is claimed is:

1. A ballast for powering at least one high-intensity discharge lamp, comprising:

a pair of input connections adapted to receive a conventional source of alternating current (AC) voltage;

a pair of output connections for connection to the lamp;

a pair of dimming control inputs for connection to an external dimming controller, the external dimming controller being operable to receive a user relamp command and, in response, provide a special relamp signal at the dimming control inputs;

an ignitor coupled to the output connections and operable to provide high voltage pulses for igniting the lamp;

a control circuit coupled to the ignitor and operable to direct the ignitor to provide high voltage pulses; and a dimming interface coupled to the dimming control inputs and the control circuit, the dimming interface being operable, in response to the special relamp signal from the external dimming controller following replacement of the lamp, to command the control circuit to direct the ignitor to provide high voltage pulses for igniting the lamp.

2. The ballast of claim 1, wherein the external dimming controller includes a rotatable knob, and the user relamp command consists essentially of rotating the knob fully clockwise and then rotating the knob fully counterclockwise.

3. The ballast of claim 1, wherein the special relamp signal consists essentially of a waveform having a positive transition from about zero volts to about ten volts, and a negative transition from about ten volts to about zero volts.

4. The ballast of claim 2, wherein the special relamp signal consists essentially of a waveform having a positive transition from about zero volts to about ten volts, and a negative transition from about ten volts to about zero volts.

5. The ballast of claim 1, wherein the external dimming controller includes a dedicated relamp switch, and the user relamp command consists essentially of depressing and releasing the relamp switch.

6. The ballast of claim 4, wherein the special relamp signal consists essentially of a waveform having a positive transition from about zero volts to about ten volts, and a negative transition from about ten volts to about zero volts.

7. A ballast for powering at least one high-intensity discharge lamp, comprising:

first and second input connections adapted to receive a conventional source of alternating current (AC) voltage, wherein the first input connection is coupled to a hot lead of the source of AC voltage via an external control device, and the second input connection is coupled to a neutral lead of the source of AC voltage, the external control device being operable to receive a user relamp command following replacement of the lamp and, in response, to provide a special relamp signal at the first input connection;

a pair of output connections for connection to the lamp;

an ignitor coupled to the output connections and operable to provide high voltage pulses for igniting the lamp; and a control circuit coupled to the first input connection and the ignitor, the control circuit being operable to receive the special relamp signal from the external control device following replacement of the lamp and, in response, to direct the ignitor to provide high voltage pulses for igniting the lamp.

8. The ballast of claim 7, wherein the external control device is a conventional triac dimmer.

9. The ballast of claim 7, wherein the special relamp signal consists essentially of a sinusoidal voltage wherein at least one half-cycle of the sinusoidal voltage has a truncated portion.

* * * * *